US007209137B2

(12) United States Patent
Brokenshire et al.

(10) Patent No.: US 7,209,137 B2
(45) Date of Patent: Apr. 24, 2007

(54) EFFICIENT TRIANGULAR SHAPED MESHES

(75) Inventors: Daniel Alan Brokenshire, Round Rock, TX (US); Charles Ray Johns, Austin, TX (US); Barry L. Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 10/242,523

(22) Filed: Sep. 12, 2002

(65) Prior Publication Data

US 2004/0051715 A1  Mar. 18, 2004

(51) Int. Cl.
*G06T 15/30* (2006.01)
*G06T 17/00* (2006.01)
*G09G 5/36* (2006.01)

(52) U.S. Cl. .................. 345/423; 345/420; 345/557
(58) Field of Classification Search ................ 345/419, 345/420, 423, 553, 557
See application file for complete search history.

(56) References Cited

U.S. PATENT DOCUMENTS

| 5,841,443 | A   |   | 11/1998 | Einkauf |         |
|-----------|-----|---|---------|---------|---------|
| 6,016,153 | A   |   | 1/2000  | Gueziec et al. | |
| 6,028,607 | A   | * | 2/2000  | Chan ........................... | 345/419 |
| 6,031,548 | A   |   | 2/2000  | Gueziec et al. | |
| 6,078,331 | A   |   | 6/2000  | Pulli et al. | |
| 6,130,673 | A   |   | 10/2000 | Pulli et al. | |
| 6,137,492 | A   |   | 10/2000 | Hoppe |         |
| 6,144,773 | A   |   | 11/2000 | Kolarov et al. | |
| 6,184,908 | B1  | * | 2/2001  | Chan et al. .................. | 345/522 |
| 6,307,555 | B1  |   | 10/2001 | Lee |         |
| 6,356,263 | B2  | * | 3/2002  | Migdal et al. .............. | 345/423 |
| 6,525,722 | B1  | * | 2/2003  | Deering ...................... | 345/419 |
| 6,559,842 | B1  | * | 5/2003  | Deering et al. ............. | 345/420 |
| 2001/0013866 | A1 | | 8/2001 | Migdal et al. | |
| 2001/0033281 | A1 | | 10/2001 | Yoshida et al. | |

FOREIGN PATENT DOCUMENTS

WO   WO 97/32281 A1   9/1997

OTHER PUBLICATIONS

Evans et al, Optimizing Triangle Strips for Fast Rendering, 1996, IEEE, State University of New York at Stony Brook, pp. 319-326.*
Reic Hall, Efficient Subdivision Surface Evaluation, 2001, University of Waterloo, 59 pages.*
"Rough quadrilateralation from a triangular mesh via layer-based decomposition"; *International Business Machines Corporation Research Disclosure 433102*; May 2000; pp. 907-908.
Kobbelt, Leif; Abstract; "√3-Subdivision"; Max-Planck Institute for Computer Sciences, Im Stadtwald, 66123 Saarbrücken, Germany.

* cited by examiner

*Primary Examiner*—Kee M. Tung
*Assistant Examiner*—Hau Nguyen
(74) *Attorney, Agent, or Firm*—Carr LLP; Diana R. Gerhardt

(57) ABSTRACT

The present invention renders a triangular mesh for employment in graphical displays. The triangular mesh comprises triangle-shaped graphics primitives. The triangle-shaped graphics primitives represent a subdivided triangular shape. Each triangle-shaped graphics primitive shares defined vertices with adjoining triangle-shaped graphics primitives. These shared vertices are transmitted and employed for the rendering of the triangle-shaped graphics primitives.

11 Claims, 4 Drawing Sheets

*FIG. 3*

```
drawTriangularMesh(int width)
{
 int vtxCount = 0;
 Vertex buffer[MAX_MESH_WIDTH], *nextVtx;
 boolean firstRow = True;

while (width) {
  nextVtx = fetchNextVertex0;
  if(!firstRow) {
    if (vtxCount) {
     renderTriangle(&buffer[vtxCount-1], nextVtx, &buffer[vtxCount]);
    }
    renderTriangle(&buffer[vtxCount], nextVtx, &buffer[vtxCount+1]);
   }
   buffer[vtxCount] = nextVtx;
   if (vtxCount++==width) {
    firstRow = False;
    vtxCount = 0;
    width--;
   }
  }
 }
}
```

EFFICIENT TRIANGULAR SHAPED MESHES

TECHNICAL FIELD

This invention relates generally to graphics, and more particularly, to the rendering triangular shaped meshes from triangle shaped graphics primitives.

BACKGROUND

In computer graphics, various graphical shapes are created and rendered by the employment of basic graphical building blocks, known as graphics primitives. One widely-used graphics primitive is a triangle graphic primitive. Triangle primitives can be aggregated into triangle strips. The triangle strips comprise a row of triangle primitives aggregated together in alternating apex-orientations, both upwards and downwards. Triangle strips are typically a flexible unit of computer graphic manipulation because they can represent a single triangle (that is, a "three vertex" triangle strip), a single quadrilateral (that is, a "four vertex" triangle strip), or a rectangular lattice comprising a plurality of vertically-aggregated triangle strips. A rectangular lattice is generally defined as a rectangular two-dimensional aggregation of a plurality of rows of triangle strips, wherein internal vertices are repeated during transmission.

Employing triangle strips can be reasonably data efficient for the transmittal and rendering of long aggregations of triangle primitives to create a single row. This is because, in a triangle strip, the number of vertices per graphical triangle shaped primitive approaches the ratio of one to one, thereby necessitating the transmission of a minimum number of vertices to render (that is, to graphically recreate and display) a triangular strip.

However, the employment of triangle strips to render a rectangular lattice entails inefficiencies. Generally, the inefficiencies are because each row of vertices internal to the rectangular lattice has to be repeated. For instance, a rectangular lattice, comprising 24 equilateral triangles, actually requires 30 strip vertices to be rendered (eight triangles per row by three rows).

Subdivision surfaces, that is, the graphical technique of segmenting a given shape into constituent sub-shapes, are becoming ever more widely employed in graphics. However, subdivision can be especially inefficient with respect to data transfer overhead, particularly when triangle strip data is generated. This is typically because, similar to a rectangular lattice, internal row vertices are repeated. In the limit (that is, as the subdivision level approaches infinity), the efficiency approaches 50%.

A second approach to graphical design is to directly support basic graphical primitives so that internal row vertices need not be repeated. This creates a mesh, such as a rectangular mesh. A rectangular mesh is generally defined as a rectangular aggregation of graphics primitives, wherein the rectangular aggregation of graphics primitives did not occur due to the two-dimensional aggregation of a plurality of triangle strips.

In one known approach of creating a rectangular mesh, the renderer caches both the previous row of vertices of a given row of aggregated triangle-shaped or quadrilateral-shaped primitives. Then, instead of receiving both rows of vertices for the next row of aggregated triangle-shaped or quadrilateral-shaped primitives, the renderer only receives the top row of vertices for the next row of aggregated triangle-shaped or quadrilateral-shaped primitives, thereby reducing the transmitted information needed to draw the rectangular mesh and increasing efficiency. Rendering a rectangular mesh can be more efficient than rendering a rectangular lattice created by the aggregation of primitive strips.

However, processor performance has outpaced memory and bus performance, while at he same time, the employment of subdivision surfaces has increased the demand for higher throughput. Therefore, there is a need for employing graphics primitives for rendering a subdivided triangle that overcomes the shortcomings of existing approaches.

SUMMARY

The present invention employs video information associated with a triangular mesh. The present invention derives a plurality of adjacent triangle-shaped primitives of a first row. Each triangle-shaped primitive is defined as having both at least one lower vertex and at least one upper vertex. At least one lower vertex and at least one upper vertex of a selected triangular primitive of the first row are cached. At least one lower vertex of the selected triangle primitive is overwritten with at least one upper vertex of the selected triangular primitive. One or more new upper vertexes of a selected triangle primitive of the next row are cached, thereby generating a triangular mesh.

BRIEF DESCRIPTION OF THE DRAWINGS

For a more complete understanding of the present invention, and the advantages thereof, reference is now made to the following Detailed Description, taken in conjunction with the accompanying drawings, in which:

FIG. 3 illustrates a "C" pseudo-code subroutine, drawTriangualarMesh( ), employable for the rendering of a triangular mesh by a video device.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise. In a further preferred embodiment, the computer program is embodied upon or within a computer program product, such as a floppy disk or compact disk, or other storage medium.

Figure 1A:
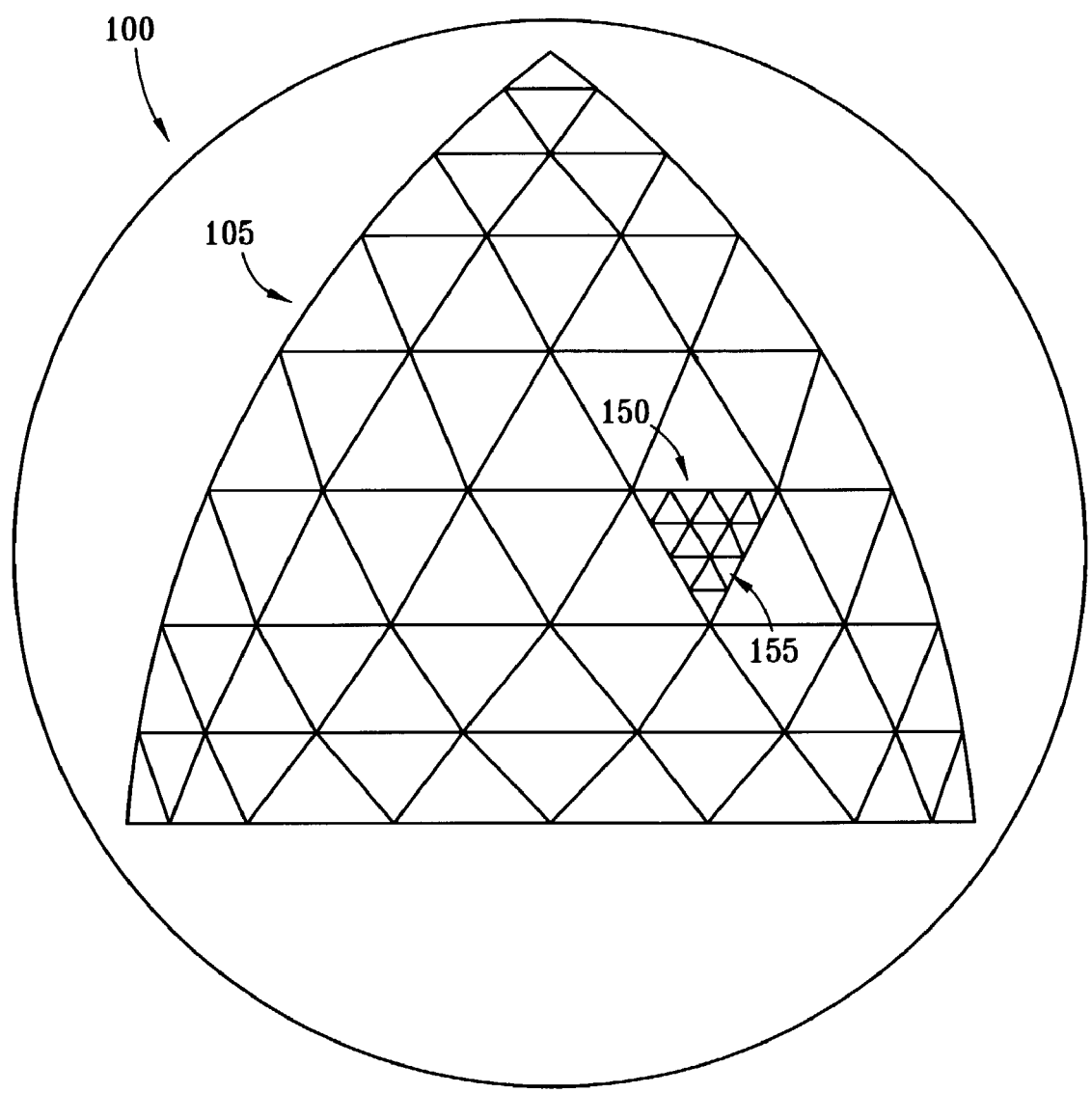
FIG. 1A illustrates a 3-dimensional shape having a triangular mesh, wherein the triangular mesh is further subdivided into triangular graphics primitives.

Referring to FIG. 1A, illustrated is an exemplary 3-dimensional shape, an octahedron 100, subdivided into a triangular shape 105, wherein the triangular shape is one triangle base of the octahedron 100. The octahedron 100 is further subdivided into triangular meshes 150. The triangular mesh 150 is subdivided into triangle primitives 155. Therefore, the triangular shape 105 also comprises a triangular mesh 150. Each triangle primitive 155 has its own unique set of defined vertices, although a vertex element of a unique set of defined vertices can be shared with another triangle primitive 155.

Generally, the subdivisions of triangular shape 105 occur to more effectively enable the creation or generation (that is, the mathematical calculation) and more accurate rendition (that is, the final display) of a given shape, such as a triangular shape. One subdivision unit of utility is the triangle primitive. In other words, a given shape, such as triangular shape 105, is ultimately subdivided into constituent elements, such as triangle primitives 155. The ultimate subdivision of triangular shape 105 into triangle primitives 155 is a technique of great utility in graphics systems.

In FIG. 1A, the triangle primitives 155 of triangular shape 105 are defined in relation to one another to comprise the triangular mesh 150. Generally, in FIG. 1A, each triangular mesh 150 is a result of both a subdivision of the triangular shape 105 and the further subdivision of this subdivision into triangle primitives 155. Therefore, the triangular shape 105 is also a triangular mesh, as it comprises triangle primitives 155 and triangular meshes 150.

The triangular shape 105, with its constituent unique vertices of the various triangle primitives 155, is typically generated in a microchip or some other graphics calculation device. Any unique vertices are then transmitted to a video display device for rendering. Unique vertices of the triangle primitives 155 are generally defined as vertices derived for the purpose of rendering graphical primitives, but these vertices are not duplicated during transmission. The unique vertices are received by the video display device and employed in the rendering of the triangular mesh 150.

In one embodiment, rendering the triangular mesh 150 on the display device is performed through the transmission of the bottom row of vertices, then the transmission of the upper row of vertices of a triangular strip. Triangle primitives are not rendered until the top vertices are received. In another embodiment, the rendering of the triangular mesh 150 is generally accomplished through transmitting both the top and bottom vertices of the first row of triangle graphics primitives 155. These transmittances can occur from the graphics calculator or processor and then storing the vertices in a local storage center, such as a vertex cache of the video device. The video device renders the first row of adjacent triangle primitives 155. The video buffer then overwrites the cached unique lower vertices of the first row of graphical primitives 155 with the values of the cached unique upper vertices of the first row of graphical primitives 155. This creates a new unique set of lower vertices employable for rendering the next row of graphical primitives 155. Employing overwriting avoids the necessity of a substantial duplication of transmission of the vertices in common between rows between the graphics calculation device and the display device.

The graphics calculation device then sends the top unique vertices of the next row of triangle primitives 155 of the triangular mesh 150 to the video device. The video display device renders a new row. The process continues until the apex of the triangular shape is reached, whereupon this last unique vertex is sent for the apex triangle primitive 155. Calculations are made to allow for the decreasing number of unique upper vertices per higher row.

Therefore, the rendered triangular shape 105 comprises triangular meshes 150. Typically, the rendered shape does not comprise a triangular lattice. A triangular lattice is generally defined as a triangular two-dimensional aggregation of a plurality of rows of triangular strips, wherein internal vertices have been repeated during transmission. The triangular mesh 150 was created and rendered through the transmission and employment of unique vertices, not through the aggregation of triangle strips, thereby substantially reducing data transmission inefficiencies.

Figure 1B:
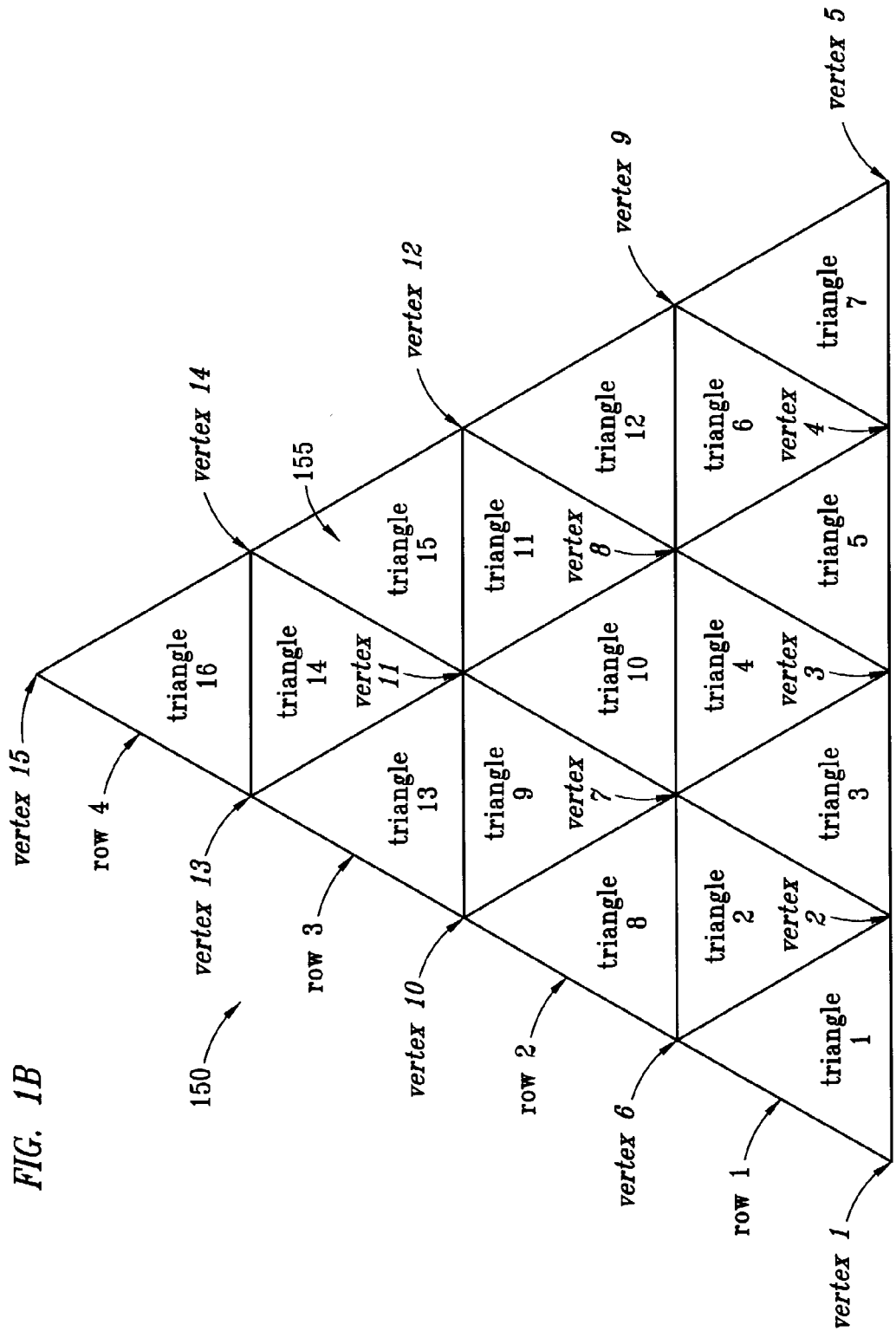
FIG. 1B illustrates a more-detailed triangular mesh, wherein the triangular mesh has been further subdivided into triangular graphics primitives.

FIG. 1B illustrates the triangular mesh 150, wherein the triangular mesh 150 is further subdivided and comprises triangle primitives 155. In the illustrated embodiment, the triangular mesh 150 comprises 16 triangle primitives. The triangle graphics primitives are illustrated as numbered from 1 to 16, and are placed in four rows. The first row comprises triangle primitives 1 through 7, inclusive. The second row comprises triangle primitives 8 through 12, inclusive. The third row comprises triangle primitives 13 through 15, inclusive. Finally, the fourth row comprises triangle primitive 16. Although illustrated as comprising four rows, those skilled in the art will understand that, in a further embodiment, the triangular mesh 150 can comprise more than four rows of triangle primitives 155.

Within each row, the base of a first triangle primitive 155 and the last triangle primitive 155 within the selected row is oriented to the bottom of the triangular mesh 150. The remaining triangle primitives alternate in orientation. In other words, contiguous to the triangle primitive "1", the apex of which is oriented to the top of the triangular mesh 150, there is a triangle primitive "2", the apex of which is oriented to the base of the triangular mesh 150, and so on. This alternation continues until the last triangle primitive is reached per row, wherein the apex of the last triangle primitive is oriented to the apex of the triangular mesh 150.

The triangle primitives "1" through "7" of row 1 have vertices associated with them. Triangle primitive "1" of row 1 is defined by the bottom vertices "1" and "2" and the top vertex "6." Triangle primitive "2" of row 1 is defined by the bottom vertex "2" and the top vertices "6" and "7". Triangle primitive "3" of row 1 is defined by the bottom vertices "2" and "3" and the top vertex "7", and so on.

In the triangular mesh 150, the top vertices of the triangle graphics primitives of row 1 are defined as the bottom vertices of the triangle vertices of row 2. For instance, vertex "6", the top vertex of triangle primitive "1" of row 1, and vertex "7", the top vertex of triangle primitive "2" of row 1, are defined as the bottom vertices of triangle primitive "8" in row 2. Vertex "7", the top vertex of triangle primitive "3" of row 1, and vertex "8", the top vertex of triangle primitive "5" of row 1, are defined as the bottom vertices of triangle primitive "10" in row 2. Vertex "7", the top vertex of triangle primitive "3" of row 1, is also defined as the bottom vertex of triangle primitive "9" in row 2. The redefining of the top vertices of a prior row as the bottom vertices of a consecutive row is continued until defining the upper vertex of the triangle primitive of the final row. In the illustrated embodiment, this is triangle primitive "16".

Within the triangular mesh 150, the lower vertices of each triangle primitive of a higher-order row (for example, row 3) are defined as a function of the upper vertices of the triangle primitives of a lower-order row (for example, row 2). Therefore, the triangular mesh 150 can be rendered with the transmission of only unique vertices. Employment of only unique vertices to construct a triangular mesh requires a transmission of a lesser number of vertices than is required to construct a triangular lattice, of the same shape and size, from the vertical aggregation of a plurality of triangle strips.

Rendering a triangular lattice, constructed of a plurality of triangle strips, requires non-unique vertices. This is because each row of the aggregated triangle strips, which creates the triangular lattice, is defined independently from a consecutive triangle strip in the triangular lattice, therefore requiring more vertices to be independently defined than in a triangular mesh.

A comparison of efficiencies between triangular meshes 150 and a triangular lattice is demonstrated in the following table. The "level" is generally defined as the number of bisections performed, that is level "0" is a unitary triangle, level "1" is a bisected triangle, level "2" is a bisected triangle wherein each bisection has been further bisected, and so on. The "alternate level" is generally defined as a triangle that has been subdivided into a given number of equal subdivisions. In other words, an alternate level of 0 represents a unitary triangle, an alternate level of 1 represents a subdivided bisected triangle, an alternate level of 2 represents a subdivided trisected triangle, and so on. In other words, alternate levels comprise subdividing a triangle to the nth division ("n-sectioning), such as a bisection, a trisection, and so on.

"Unique mesh vertices" are generally defined as the number of vertices required to construct a subdivided triangular mesh, "triangle strip vertices" are generally defined as the number of vertices required to construct a subdivided triangle lattice from triangle strips. "Efficiency" is a comparison of the efficiency of employing triangle strip vertices for constructing a triangular shape to employing the unique vertices of a triangular mesh to create a triangular shape.

| Level | Alternate Level | Unique Mesh Vert. | Triangle Strip Vert. | Efficiency |
|---|---|---|---|---|
| 0 | 0 | 3 | 3 | 100% |
| 1 | 1 | 6 | 8 | 67% |
| 2 | 3 | 15 | 24 | 62% |
| 3 | 7 | 45 | 80 | 56% |
| 4 | 15 | 153 | 288 | 53% |
| n | $2^{n}-1$ | $1 + 2^{(2*n-1)} + 3*2^{(n-1)}$ | $4^n + 2^{(n+1)}$ | Asymptotically approaches 50% |

Therefore, it is typically more efficient to render a triangular shape from unique vertices, thereby creating a triangular mesh, than from strip vertices, thereby creating a triangular lattice.

Figure 2:
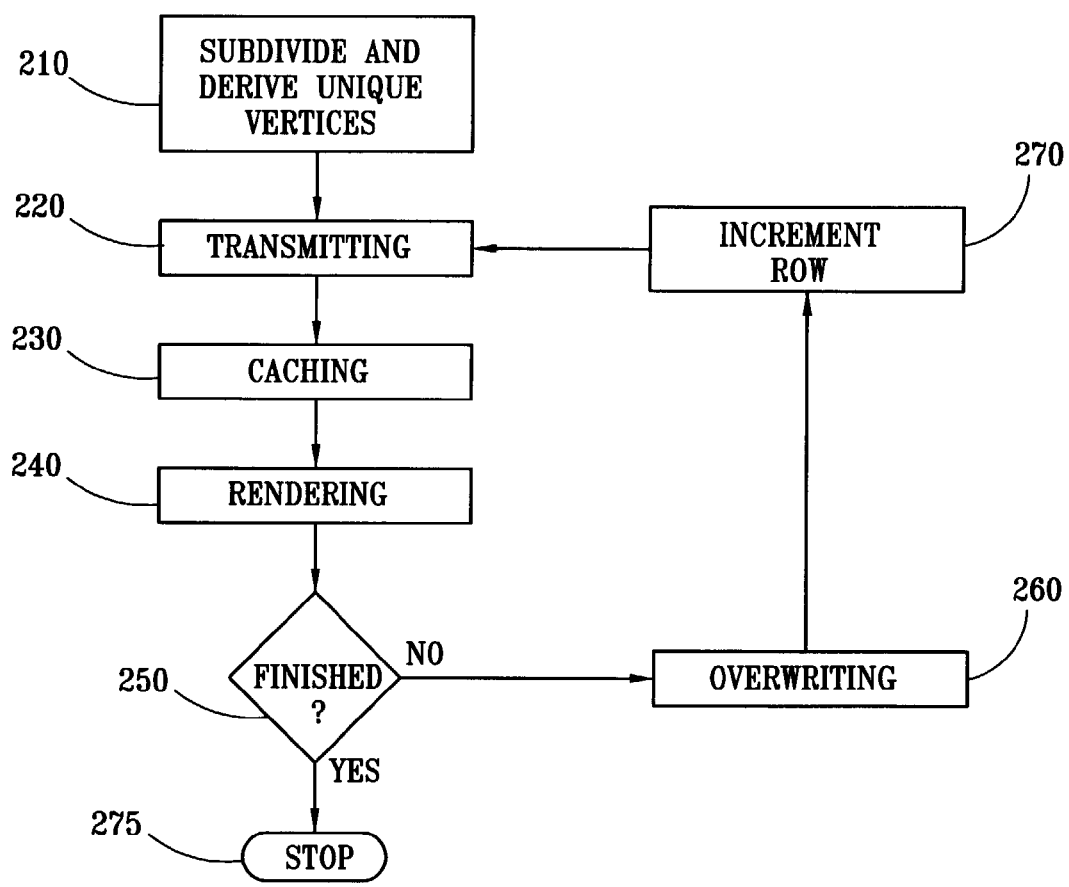
FIG. 2 illustrates a method for employing and rendering display information associated with a triangular mesh.

Turning now to FIG. 2, illustrated is a method 200 for creating and rendering the triangular mesh 150. Generally, the method 200 calculates the vertices of the graphics primitives that represent subdivisions of a triangular shape 105. In method 200, the subdivisions comprise triangle primitives. Then, the method 200 transmits unique vertices to the video device. The video device renders the triangle graphics primitives as the triangular mesh 150.

In step 210, the graphics processor calculates and derives the unique vertex coordinates for the subdivided triangular area 105. The triangular area 105 is then subdivided into triangle graphics primitives, creating a triangular mesh 150. In one embodiment, the subdividing comprises a bisection. As will be understood by those of skill in the art, other subdivision sub-secting schemes are within the scope of the present invention.

In step 220, the graphics processor transmits the plurality of unique vertices for a selected row to the video display. If the unique vertices to be transmitted contain the lower vertices of the bottom row, both the upper and lower vertices of the first row are transmitted, wherein first all of the lower vertices are transmitted, then all of the upper vertices are transmitted. If the vertices to be transmitted do not contain the lower vertices of the bottom row, only the upper vertices are transmitted for the row.

In step 230, the video device caches the values of the vertices of the triangle primitives as derived in step 210 and transmitted in step 220, wherein first all of the lower vertices are transmitted, then all of the upper vertices are transmitted. If the vertices to be transmitted contain the lower vertices of the bottom row, both the upper and lower vertices are cached in the step 230. If the received vertices do not contain the lower vertices of the bottom row, only the upper vertices for the row are transmitted in step 220 and received and cached in step 230.

In step 240, the video device renders the triangle primitive or primitives 155. In one embodiment, the rendering process is performed by the video device further comprises the steps of lighting, shading, and texture/displacement mapping the triangle primitive 155.

In step 250, if the rendering graphical object is finished, that is, if the apex vertex of the apex triangle primitive has been received, then stop step 275 is executed. In other words, the triangular mesh 150 has been rendered. If the apex vertex of the apex triangle primitive has not yet been received, step 260 is executed.

In step 260, the video display overwrites the values of the lower vertices of the newly transmitted row with the values of the higher vertices of the previously transmitted row. Therefore, the higher vertices of the previous row become the lower vertices of the next row. In step 270, the next row to be transmitted is incremented (for example, from row 2 to row 3). In step 220, the graphics processor transmits the higher vertices of this new row, and so on.

Turning briefly to FIG. 3, disclosed is a "C" pseudo-code subroutine drawTriangularMesh( ) for rendering the triangular mesh 150 by the video device. Generally, the MAX_MESH_WIDTH variable equals the maximum number of vertices in the bottom row of the subdivided triangle, such as the triangular mesh 150. In FIG. 3, MAX_MESH_WIDTH is the maximum allowable "width" parameter.

Generally, renderTriangle( ) is called to render 0, 1, or 2 triangle primitives for each vertex received. Zero triangle primitives are rendered for the first ("width") row of vertices. One triangle primitive is rendered for the first vertex of each row. Two triangle primitives are rendered for each subsequent vertex. The subroutine renderTriangle( ) also renders the triangle primitive in a higher row. This continues until the very highest row, which comprises only a single triangle primitive. Those skilled in the art understand the use and applications of "C" pseudo-codes, and therefore the C pseudo-code will not be described in more detail.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for employing video information associated with a triangular mesh, comprising:
   (a) deriving a plurality of adjacent triangle primitives of a first row of triangle primitives and at least a next row of triangle primitives, wherein each triangle primitive comprises at least one lower vertex and at least one upper vertex;
   (b) defining unique mesh vertices that are required to construct the triangular mesh, wherein each unique mesh vertex represents a vertex of one or more triangle primitives;
   (c) for the first row of triangle primitives, caching lower unique mesh vertices and upper unique mesh vertices, wherein each unique mesh vertex is only represented once;
   (d) overwriting lower unique mesh vertices of the next row of triangle primitives with the upper unique mesh vertices of the first row of triangle primitives;
   (e) caching upper unique mesh vertices of the next row of triangle primitives; and
   (f) repeating steps (d)–(e) as necessary, thereby generating a triangular mesh.

2. The method of claim 1, further comprising the step of rendering the triangular mesh.

3. The method of claim 1, wherein the step of deriving further comprises the step of subdividing a triangular shape into triangle primitives.

4. The method of claim 3, wherein the step of subdividing comprises creating a substantially equalized bisection.

5. The method of claim 4, wherein the subdividing comprises creating a substantially equalized n-section.

6. A method for transmitting display information, comprising:
   subdividing a triangular shape of display information into triangle primitives, wherein each triangle primitive has at least one lower vertex and at least one upper vertex;
   defining unique mesh vertices that represent the triangle primitives, wherein each unique mesh vertex is a vertex of at least one triangle primitive;
   transmitting unique mesh vertices, wherein each unique mesh vertex is only transmitted once, wherein the step of transmitting further comprises:
   (a) transmitting and caching lower unique mesh vertices and upper unique mesh vertices of a first row of triangle primitives;
   (b) overwriting lower unique mesh vertices of a next row of triangle primitives with the upper unique mesh vertices of the first row of triangle primitives;
   (c) transmitting and caching upper unique mesh vertices of the next row of triangle primitives;
   (d) repeating steps (b)–(c) as necessary; and rendering a triangular mesh from the plurality of triangle primitives.

7. The method of claim 6, wherein the subdividing comprises recursively performing substantially equalized bisections.

8. The method of claim 6, wherein the subdividing comprises creating a substantially equalized n-section.

9. The method of claim 6, wherein the step of subdividing further decomposes a subdivision into further subdivisions, but not exceeding the maximum receptive capacity of a vertex cache.

10. A computer program product for employing video information associated with a triangular mesh, the computer program product having a medium with a computer program embodied thereon, the computer program comprising:
    (a) computer code for deriving a plurality of adjacent triangle primitives of a first row of triangle primitives and at least a next row of triangle primitives, wherein each triangle primitive comprises at least one lower vertex and at least one upper vertex;
    (b) computer code for defining unique mesh vertices that are required to construct the triangular mesh, wherein each unique mesh vertex represents a vertex of one or more triangle primitives;
    (c) computer code for caching lower unique mesh vertices and upper unique mesh vertices of the first row of triangle primitives, wherein each unique mesh vertex is only represented once;
    (d) computer code for overwriting lower unique mesh vertices of the next row of triangle primitives with the upper unique mesh vertices of the first row of triangle primitives;
    (e) computer code for caching upper unique mesh vertices of triangle primitives; and
    (f) repeating steps (d)–(e) as necessary, thereby generating a triangular mesh.

11. A method for employing video information associated with a triangular mesh, comprising:
    deriving a plurality of contiguous triangle primitives from the video information, wherein each triangle primitive comprises two lower and one upper vertices or two upper and one lower vertices;
    for each contiguous triangle primitive in a first row (r=1) of triangle primitives, wherein the first row is an outer row of the triangular mesh, caching both the upper and lower vertices;
    for each contiguous triangle primitive in a second row or y row, where y=r+1, of triangle primitives adjacent to the first row or r row, caching only the vertices that do not overlap the vertices in the first row or r row and overwriting the overlapping vertices of the second row or y row with the overlapping vertices of the first row or r row, such that each vertex in the second row or y row is cached only once;
    add 1 to r; and
    for each y row, repeating the above two steps until no more rows exists, thereby creating the triangular mesh.

* * * * *